(12) United States Patent
Hsu

(10) Patent No.: US 6,381,807 B1
(45) Date of Patent: May 7, 2002

(54) ELASTIC GLASSES TEMPLE

(76) Inventor: Ming-Ching Hsu, P.O. Box 90, Tainan City (TW)

( * ) Notice: Subject to any disclaimer, the term of this patent is extended or adjusted under 35 U.S.C. 154(b) by 0 days.

(21) Appl. No.: 09/200,769

(22) Filed: Nov. 30, 1998

(51) Int. Cl.[7] ................................................. G02C 5/16

(52) U.S. Cl. .......................... 16/228; 351/123; 351/153

(58) Field of Search .......................... 16/228; 351/123, 351/122, 104, 113, 115, 153

(56) References Cited

U.S. PATENT DOCUMENTS

| | | | | |
|---|---|---|---|---|
| 4,747,183 A | * | 5/1988 | Drlik | 16/228 |
| 5,018,242 A | * | 5/1991 | Guy et al. | 16/228 |
| 5,473,395 A | * | 12/1995 | Huang | 351/113 |
| 5,739,891 A | * | 4/1998 | Wei | 351/113 |
| 6,027,215 A | * | 2/2000 | Hsu | 351/114 |

FOREIGN PATENT DOCUMENTS

WO           98/33087    *  7/1998  ............ G02C/5/22

* cited by examiner

Primary Examiner—Anthony Knight
Assistant Examiner—Vishal Patel
(74) Attorney, Agent, or Firm—Bacon & Thomas, PLLC

(57) ABSTRACT

An elastic glasses temple includes a connector, a temple body having a round hook in a front end to pivotally connected to the connector, a sleeve fitting around a front portion of the temple body with a coil spring fitted in a second hole formed in a rear portion of the sleeve, a coil spring and a position member combined together. The position member is fixed on the temple body, fitting in a rear end of the sleeve. When the temple body is forced to swing outward by exterior force, with a screw fitting in said round hook as a pivot, the sleeve is pushed to move rearward to compress the coil spring to absorb exterior force to permit the temple body swing outward. The temple body swings back after exterior force disappears with resilience of the the coil spring. Then this temple can suit to any sizes of users' faces.

1 Claim, 5 Drawing Sheets

ELASTIC GLASSES TEMPLE

BACKGROUND OF THE INVENTION

This invention relates to an elastic glasses temple, particularly to one possible to swing outward and swing back resiliently, easily to be assembled and also collapsible conveniently.

Each of the common conventional glasses temples has an aperture and a threaded hole formed in a rear end of a lens frame, a connector combined with a front end of a temple and provided with a hole. The lens frame may be connected to the connector for a user to wear. But this kind of structure having a definite width, is not ideal for any sizes of different users' faces. In addition, the temple and the lens frame are connected to each other threadably, so collapsing the temples needs comparatively large force. Although there are some elastic glasses temples for suiting to different users, they are rather complicated, resulting in high cost.

SUMMARY OF THE INVENTION

The purpose of the invention is to offer a kind of elastic glasses temple possible to suit to any sizes of users' faces, and having an easy structure to be assembled conveniently.

The feature of the invention is a connector provided with an aperture for a round hook formed in an inner end of a temple to fit and pivotally connected with a screw, a stop face formed beside the aperture and a vertical threaded hole through the aperture. Then a sleeve fits around a front portion the temple with a first hole in a front portion and a second hole in a rear portion for a coil spring to be contained therein. Further a position member is fixed around the temple and fits in a rear end of the sleeve to stop the coil spring. In case the temple is forced to swing outward, the sleeve is moved rearward by stop face of the connector, compressing the coil spring to permit the temple expand outward elastically. The temple returns to its original position after exterior force disappears.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
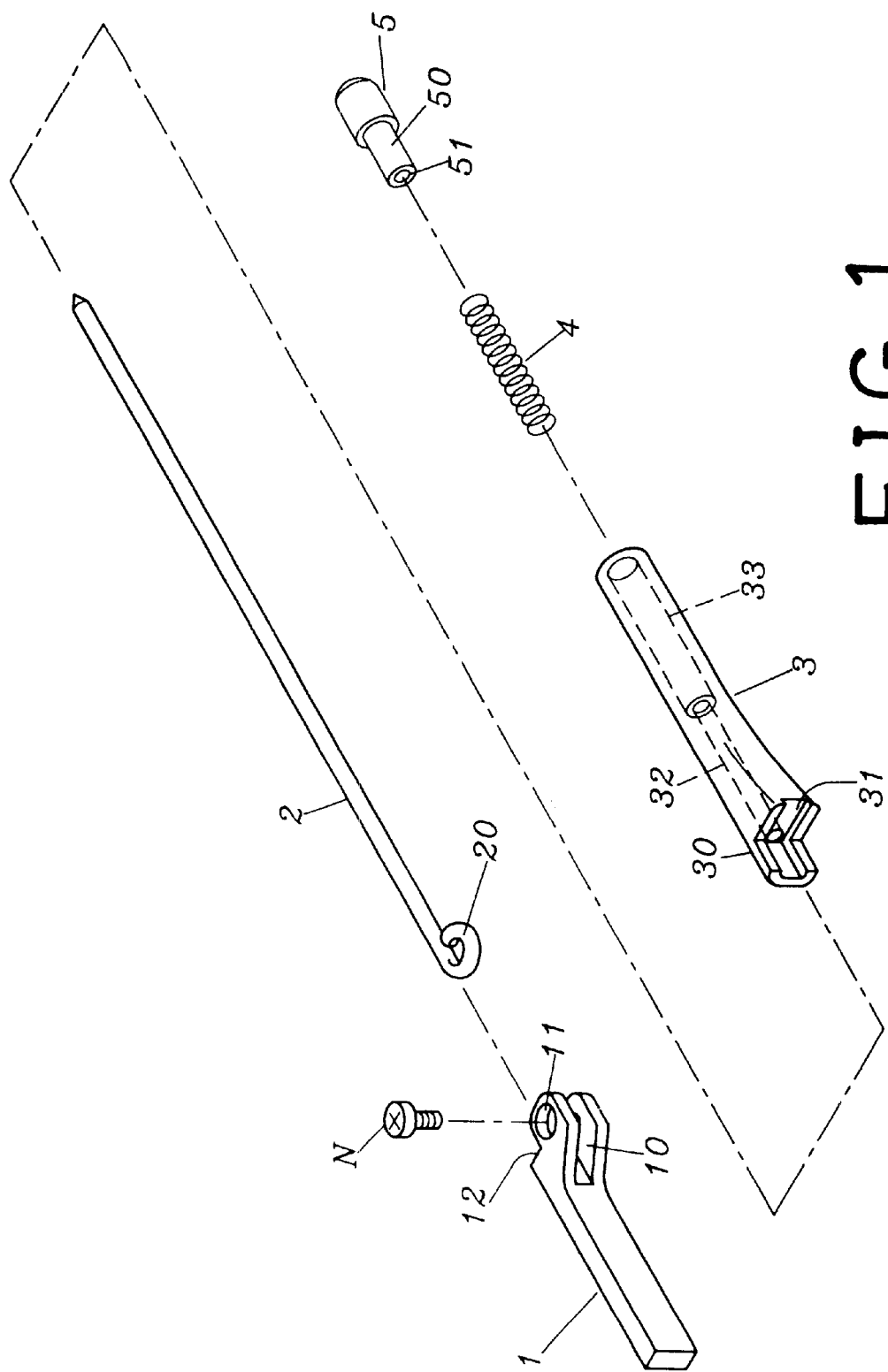
FIG. 1 is an exploded perspective view of an elastic glasses temple in the present invention.

A preferred embodiment of an elastic glasses temple in the present invention, as shown in FIG. 1, includes a connector 1, a temple body 2, a sleeve 3, a coil spring 4, and a position member 5 as main components combined together.

The connector 1 has an aperture 10 formed in an outer end, a threaded hole 11 vertically provided to pass through the aperture 10, and a stop face 12 formed beside the threaded hole 11.

Figure 3:
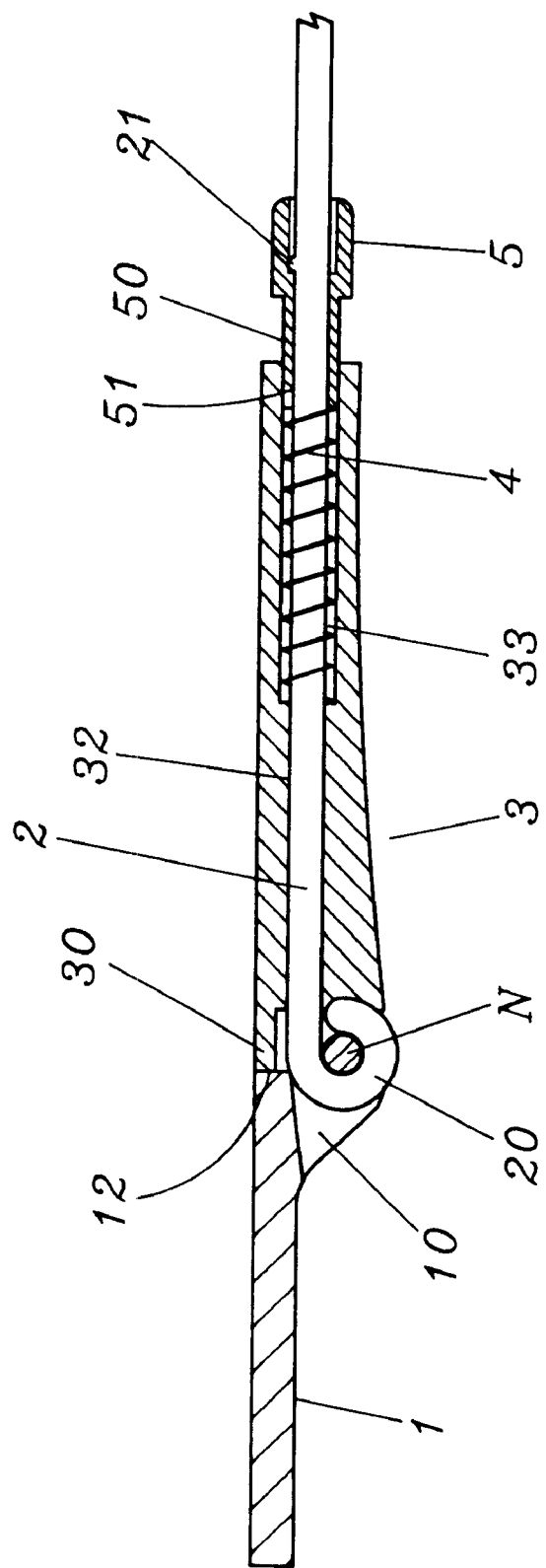
FIG. 3 is a cross-sectional view of the elastic glasses temple in the present invention.

The temple body 2 is made of a bar, having a round hook 20 formed in an inner end and a projection 21 formed on a lengthwise surface, as shown in FIG. 3.

The sleeve 3 made of plastic and with a nearly round post shape has a projecting stopper 30 extending from an inner end, an L-shaped groove 31 formed in the stopper 30 and the inner end, a first hole 32 formed in a front portion and a second hole 33 of a bigger diameter than that of the first hole 32 formed in a rear portion. Then the temple body 2 fits through the sleeve 3 at its front portion with the round hook 20 exposed just out of the sleeve 3 to fit in the aperture 10 of the connector 1 and pivotally connecting the temple body 2 with the connector 1 with a screw N.

The coil spring 4 fits around the temple body 3, contained in the second hole 33 of the sleeve 3.

The position end 5 fits tightly with the outer end of the temple body 2, having a front small diameter portion 50 with a center hole 51, fitted in a rear end of the sleeve 3, stopping a rear end of the coil spring 4.

Figure 2:
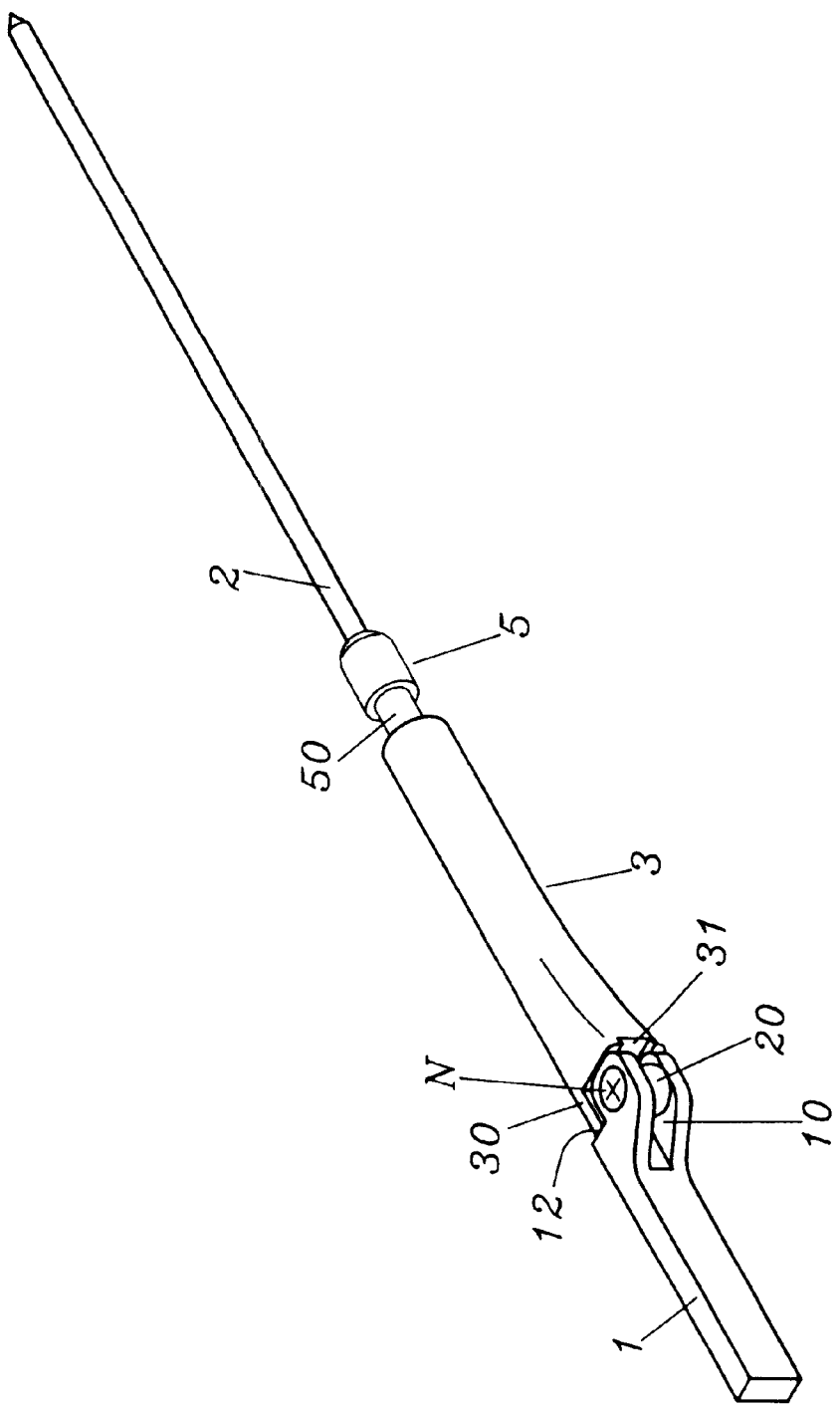
FIG. 2 is a perspective view of the elastic glasses temple in the present invention.

In assembling, referring to FIGS. 2 and 3, firstly the outer end of the temple body 2 is inserted through the first hole 32 and the second hole 33 of the sleeve 3, and the round hook 20 is put in the L-shaped groove 31, with the outer end passing through the coil spring 4 contained in the second hole 33 and the position member 5 to let the projection 21 engaging with the position member 5 stabilized at its position. Lastly the round hook 20 is fitted in the aperture 10, with the stopper 30 resting against the stop face 12 of the connector 1. Then a screw N is screwed with the threaded hole 11 and uniting pivotally the connector 1 with the temple body 2 in the aperture 10 to finish assemblage.

Figure 4:
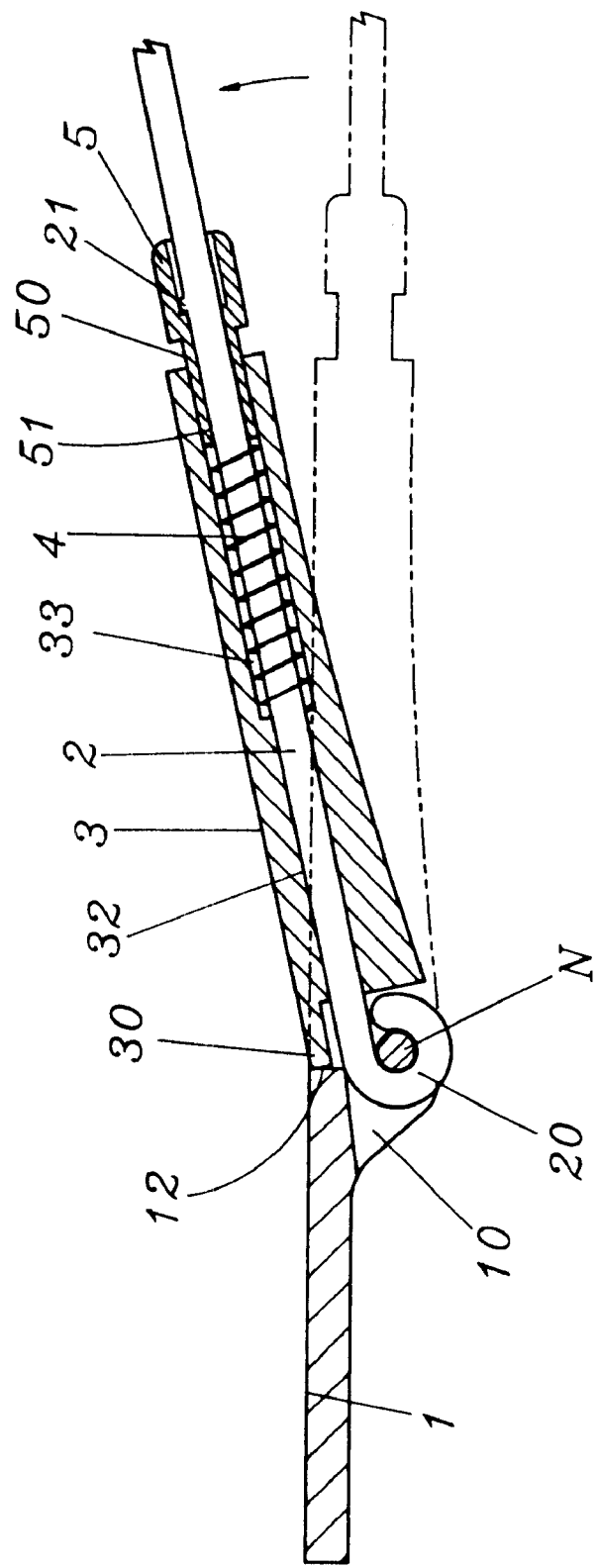
FIG. 4 is a cross-sectional view of the elastic glasses temple stretched outward in the present invention; and, FIG. 5 is a cross-sectional view of the elastic glasses temple collapsed in the present invention.
Figure 5:
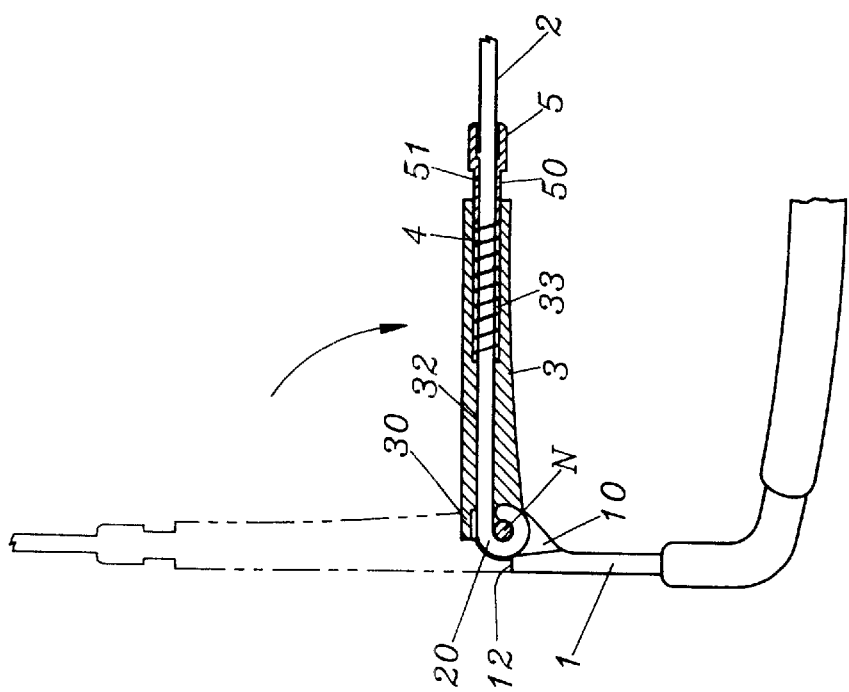

In using, referring to FIG. 4, when the temple body 2 is expanded outward by exterior force, the screw N functions as a pivot, and the sleeve 3 is pushed to move rearward, compressing the coil spring 4 in the second hole 33 to absorb exterior force to permit the temple body 2 swing outward. In case that the force disappears, the coil spring 4 recovers resilience so that the temple in the invention can suit to any sizes of users' faces, with the round hook 20 of the temple body 2 pivotally connected to the connector 1 to permit the temple body 2 easily swing outward and inward to recover its original position. Further, the temple body 2 may be bent easily for 90 degrees, as shown in FIG. 5, collapsible conveniently.

As can be understood from the aforesaid description, the temple in the invention has the following advantages:

1. It has a simple structure, easily assembled.
2. It surely has a resilience to expand outward and recover its original position.
3. It can also be collapsed easily with little force.
4. It can suit to any sizes of users' faces.

While the preferred embodiment of the invention has been described above, it will be recognized and understood that various modifications may be made therein and the appended claims are intended to cover all such modifications which may fall within the spirit and scope of the invention.

What is claimed is:

1. An elastic glasses temple comprising:
    a connector having an aperture formed in a rear end, a stop face formed beside said aperture, a threaded hole formed to pass through vertically said aperture;
    a temple body having a round hook formed in an inner end and fitting in said aperture of said connector;
    a sleeve for a front portion of said temple body to fit therein, having a stopper formed to extend from a front end, an L-shaped groove formed in the front end and in said stopper, a first hole formed in a front portion and a second hole of a bigger diameter than that of said first hole formed in a rear portion;

a coil spring contained in said second hole of said sleeve and fitting around a part of said front portion of said temple body;

a position member having a small diameter front portion, and a center through hole, fitted through by said temple body and fixed stably on an intermediate portion of said temple with a projection formed on an outer surface of a front portion of said temple body;

said temple body forced to swing outward with said screw fitting in said threaded hole of said connector and functioning as a pivot, with said stopper of said sleeve pushed by said stop surface of said connector so that said sleeve may be moved rearward to compress said coil spring in said second hole, said coil spring absorbing exterior force to permit said temple body to swing outward, said spring having recovering resilience to let said temple body swing back to its original position after the exterior force disappears, thus said temple body can be applied to many different users faces, and said temple body further can be easily collapsed inward for approximately 90 degrees.

* * * * *